United States Patent [19]
Iwaya et al.

[11] Patent Number: 5,476,822
[45] Date of Patent: Dec. 19, 1995

[54] CERAMIC COMPOSITION FOR THERMISTOR, THERMISTOR ELEMENT, AND PROCESS FOR PRODUCING SAME

[75] Inventors: Masaki Iwaya; Kyohei Hayashi; Hiroshi Matsuzaki; Yoshirou Suematsu, all of Aichi, Japan

[73] Assignee: NGK Spark Plug Co., Ltd., Aichi, Japan

[21] Appl. No.: 239,828

[22] Filed: May 9, 1994

[30] Foreign Application Priority Data

May 7, 1993 [JP] Japan ................................. 5-131451
Dec. 22, 1993 [JP] Japan ................................. 5-346652

[51] Int. Cl.$^6$ .................................................. C04B 35/12
[52] U.S. Cl. ........................ 501/152; 501/127; 501/153; 501/134; 338/22 R; 252/521; 252/518; 252/62.3 T
[58] Field of Search ........................ 501/152, 127, 501/153, 154; 358/22 R; 252/521, 518, 62.3 T

[56] References Cited

U.S. PATENT DOCUMENTS

| | | | |
|---|---|---|---|
| 4,156,661 | 5/1979 | Brodmann et al. | 501/152 |
| 4,229,322 | 10/1980 | Marchant et al. | 252/521 |
| 4,743,881 | 5/1988 | Howng | 338/22 R |

FOREIGN PATENT DOCUMENTS

| | | |
|---|---|---|
| 48-705 | 1/1973 | Japan . |
| 49-29493 | 3/1974 | Japan . |
| 49-63995 | 6/1974 | Japan . |
| 50-118294 | 9/1975 | Japan . |
| 51-108298 | 9/1976 | Japan . |
| 61-6022 | 2/1986 | Japan . |
| 2-20121 | 5/1990 | Japan . |
| 2-44121 | 10/1990 | Japan . |
| 2-44122 | 10/1990 | Japan . |

OTHER PUBLICATIONS

Yano, K., "Fine Ceramic Handbook" published by Asakura Shoten, 1984.

Nakahara, K., "Automobile Combustion Control Sensors", vol. 30. No. 382 (1991), pp. 95–103.

*Primary Examiner*—C. Melissa Bonner
*Attorney, Agent, or Firm*—Fish & Richardson

[57] ABSTRACT

A ceramic composition for thermistor exhibiting stable resistance values over a wide temperature range and capable of being used for a prolonged time. The composition is represented by $(M^1M^2O_3)_{1-x} \cdot (M^1AlO_3)_x$, wherein $M^1$ is an element selected from the elements of the group 3A of the International Periodic Table excluding La and $M^2$ is an element of the groups 4A, 5A, 6A, 7A and 8 of the International Periodic Table, and wherein the mixing ratio between an electrically conductive substance stable at elevated temperatures and an insulating substance stable at elevated temperatures, may be adjusted. A thermistor formed of the composition is superior in high-temperature stability and can be used over a broad temperature range because its resistance value can be selected to an optimum value.

29 Claims, 1 Drawing Sheet

CERAMIC COMPOSITION FOR THERMISTOR, THERMISTOR ELEMENT, AND PROCESS FOR PRODUCING SAME

FIELD OF THE INVENTION

This invention relates to a ceramic (or porcelain) composition for a thermistor which is superior in high temperature stability.

BACKGROUND

As a thermistor material which may be employed at higher temperatures, (a) a material mainly composed of a corundum type crystal structure, as disclosed for example in JP Patent KOKAI Publication No. 50-118294 (JP-A-118284/75) or in "Fine Ceramic Handbook" by K. Yano, published by ASAKURA SHOTEN in 1984; (b) a material mainly composed of a compound having a spinel type crystal structure, as disclosed for example in JP Patent KOKAI Publication No. 48-63985 (JP-A-63995/74), (c) a material mainly composed of zirconia, as disclosed in, e.g., "Nainenkikan" (Internal Combustion Engine) vol 30, No. 8, page 98, and (d) a material mainly composed of a compound having a perovskite type crystal structure.

SUMMARY OF THE DISCLOSURE

Problems to be Solved by the Invention

However, according to the eager investigation of the inventors of the present invention the following problems have been turned out. With the material (a) mainly composed of the corundum crystal structure, the resistance—temperature characteristics can not be adjusted to a larger extent. If, for example, the additive is added in an excess quantity, the structure ceases to remain the stable corundum type crystal structure, resulting in deteriorated thermal stability.

The material (b) mainly composed of the spinel type crystal structure has a higher rate of change of the resistance versus temperature (a higher temperature gradient constant β), so that it cannot be employed over a wider temperature range. On the other hand, materials mainly composed of $NiAl_2O_4$ or $CoAl_2O_4$ are low in the thermal resistance and hence cannot be employed at elevated temperatures.

The material mainly composed of zirconia (c) is oxygen ion conductive and is increased in resistance in a temperature range lower than the activation temperature so that it cannot be employed practically.

The material mainly composed of the compound having the perovskite type crystal structure (d) has such inconvenience that, if only a slight amount of La oxides remain unreacted, the non-reacted La component reacts with the atmospheric moisture to form unstable $La(OH)_2$ with the result that the device composed of the material collapses or exhibits only unstable resistance values.

OBJECT OF THE INVENTION

It is an object of the present invention to provide a improved novel ceramic composition for thermistor.

It is another object of the present invention to provide a ceramic thermistor which overcomes the above problems.

It is a further object of the present invention to provide a ceramic composition for thermistor which has a broad range of resistance values by adjusting the composition of the material.

It is a still further object of the present invention to provide a ceramic composition for thermistor which can be sintered at a temperature not higher than 1600° C. to prevent electrode deterioration, which is free from hygroscopic substances and the resulting sintered body is less susceptible to deterioration in characteristics due to the atmospheric humidity or heat hysteresis and which can be employed over a wide temperature range of from room temperature to 1100° C.

It is a further object of the present invention to provide not only the ceramic compositions aforementioned, but to provide an improved thermistor elements which are obtainable by sintering the aforesaid compositions.

It is also an object of the present invention to provide a process for producing the aforementioned compositions and thermistor element using the same.

Still further objects of the invention will become apparent from the entire disclosure.

At least one of the said objects is accomplished by the following ceramic composition and a thermistor element obtainable from the same composition. The present invention further provides a process for producing a thermistor element.

The ceramic composition for the thermistor according to the present invention is represented by the formula $(M^1M^2O_3)_{1-x} \cdot (M^1AlO_3)_x$, where $M^1$ is one or more elements selected from the elements belonging to the group 3A excluding La, $M^2$ is one or more elements selected from the elements belonging to the groups 4A, 5A, 6A, 7A and 8 and $0.8 > x > 0$.

Part of the elements may be inter-diffused each other, such as the case with certain element(s) of $M^2$ and Al.

Definition

The groups 3A, 4A, 5A, 6A and 7A herein mean 3A, 4A, 5A, 6A and 7A of the Periodic Table according to the agreement in 1965 of the Committee for the Nomenclature for Inorganic Chemistry of International Union of Pure and Applied Chemistry (IUPAC).

According to the process aspect of the present invention, there is provided a process for producing a composition for thermistor comprising:

providing $M^1M^2O_3$ and $M^1AlO_3$, respectively, where $M^1$ is one or more elements selected from the elements belonging to the group 3A excluding La, $M^2$ is one or more elements selected from the elements belonging to the groups 4A, 5A, 6A, 7A and 8, then providing a mixture comprising $(M^1M^2O_3)_{1-x} \cdot (M^1AlO_3)_x$ where $0.8 > x > 0$.

PREFERRED EMBODIMENTS

The ceramic composition for the thermistor represented by $(M^1M^2O_3)_{1-x} \cdot (M^1AlO_3)_x$, where $M^1$ is one or more elements selected from the elements Y, Sm, Pr, Nd, Dy, Ho, Er, Gd and Yb and $M^2$ is one or more elements selected from the elements Cr, Ti, Mn, Fe and Co, where $0.8 > x > 0$, does not exhibit hygroscopicity and is free from deterioration in strength and superior in thermal resistance. Preferred of x is 0.01 or more for effective role of x.

The ceramic composition for the thermistor with x being 0.05 to 0.5 does not exhibit hygroscopicity and is free from deterioration in strength and superior in thermal resistance, so that it can be adjusted to practically satisfactory resistance values. More preferred of x is 0.1–0.4.

The ceramic composition for the thermistor mainly composed of a composition comprising $(M^1M^2O_3)_{1-x} \cdot (M^1AlO_3)_x$ admixed with a sintering aid (or aids) for improving sinterability exhibits high strength and superior thermal resistance. Any sintering aid capable of forming a liquid phase in the grain boundary for improving sinterability of the ceramics suffices. Silica, mullite or the like is preferred. The amount of addition of the sintering aid is 0.5 to 10 wt % and preferably ranges between 0.8 to 5 wt %.

$M^1M^2O_3$ is a substance exhibiting higher electrical conductivity and $M^1AlO_3$ is a substance exhibiting lower electrical conductivity. A thermistor may be provided in which, by changing the mixing ratio of these two substances, the resistance values can be easily changed and may be maintained stably at higher temperatures. The reason the thermistor exhibits superior stability at elavated temperatures is presumably that such substances as $M^1M^2O_3$ or $M^1AlO_3$ are stable at elevated temperatures, and that the melting points of $YCrO_3$ and $YAlO_3$ compounds, for example, are as high as approximately 2300° C. and 1900° C., respectively.

It has been found that a mixed system of $YCrO_3$ having high electrical conductivity and $YAlO_3$ having high electrical insulating properties is free from yielding of subsidiary components on sintering and, after sintering, is mainly composed of $YCrO_3$ and $YAlO_3$ phases, if a matrix composed of the sintering aids or unavoidable impurities are disregarded. It has also been found that the mixed system exhibits simple reactions and high stability and may be easily adjusted in resistance, such that it can be employed over a broad temperature range of from 300° C. to 1100° C.

According to the process aspect, each of the calcined masses $M^1M^2O_2$ and $M^1AlO_3$ is pulverized to form a fine powder, preferably having a mean particle size of about 1 μm or less. The resulting fine powders are mixed together in a desired proportion, without or preferably with a sintering aid.

The resultant powdery mixture is formed, e.g., by press-forming, molding, or other known shaping method followed by sintering.

Each calcination for $M^1M^2O_3$ or $M^1AlO_3$ is carried out by pre-firing each of a starting raw material mixture with a suitable proportion under the condition that yields synthesized $M^1M^2O_3$ or $M^1AlO_3$, namely at a sufficient temperature for forming calcined/synthesized mass of each compound. The calcination serves to a better sinterability at a relatively low temperature resulting in a homogeneous product without hetrogeneous reaction grades.

The calcining temperature generally ranges from 1200° to 1400° C. so that unreacted residue is minimized and sintering does not proceed in excess so as not to offer difficulty in pulverization.

The sintering is carried out under the conditions that will sinter the mass-to-be sintered to a sufficient relative density, e.g., 90%, 95% or 98% higher of the theoretical. The sintering temperature does not much depend on the selected elements for $M^1$, $M^2$, and generally lies between 1450°–1600° C., preferably about 1550° C. Rather the sintering temperature will be affected by the kind and amount of the sintering aids. The sintering temperature is selected so as to give high stability in the electric properties and a sufficient density of the sintered products.

According to the preferred embodiments of the present invention, it is generally possible to adjust the resistance values within a desired range according to the proportion of the ingredients (mixing ratios), yet more, with a reduced, controlled resistance change rate in a wider temperature range of 300° to 900° C.

According to the present invention, a ceramic composition for a thermistor could be produced which is superior in stability at elevated temperature and mechanical strength, and which can be used over a broad temperature range such that it can be used in, for example, a overheating detection device for a catalyst used for cleaning the exhaust gases of the automotive vehicles, a hot gas temperature sensor, such as a sensor for recirculated gases in an exhaust gas circulating device, a high temperature measurement device for an area exposed to a higher temperature or a temperature sensor for a variety of furnaces.

Explanation of Numerals

Figure 1:
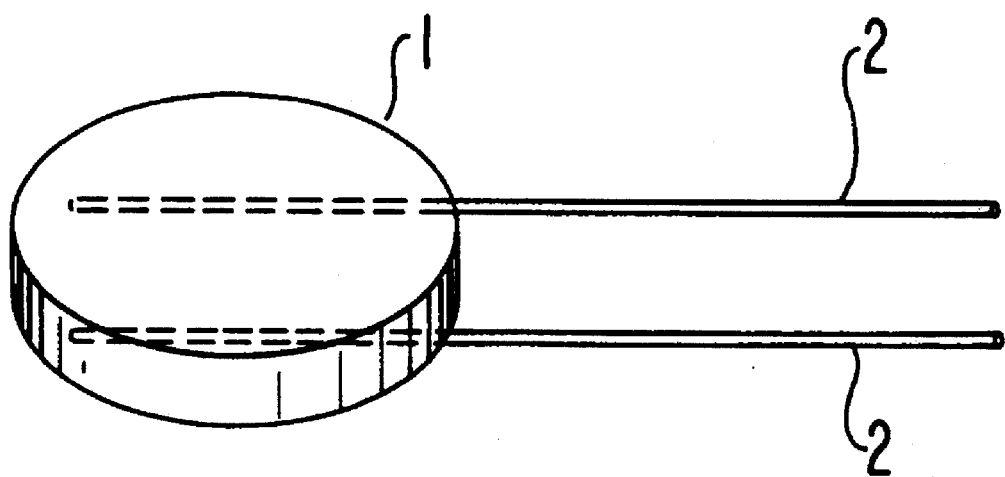
FIG. 1 shows an embodiment of the present invention.

1—thermistor element; 2—electrode.

EXAMPLES

In the following the present invention will be further elucidated with reference to the preferred embodiments which are not restrictive.

EXAMPLE 1

Example 1 of the present invention is now explained.

$Y_2O_3$ having a purity of 99.9% or higher and a mean particle size of 1 μm and $Cr_2O_3$ having a purity of 98.5% or higher and a mean particle size of 1 μm were weighted to a molar ratio of 1:1, mixed by a wet mixing method, dried and calcined (pre-fired) by subsequently maintaining the mixture 1400° C. for two hours. The resulting calcined $YCrO_3$ exhibiting high electrical conductivity was pulverized to give powders having a mean particle size of approximately 1 μm.

On the other hand, $Y_2O_3$ having a purity of 99.9% or higher and a mean particle size of 1 μm and $Al_2O_3$ having a purity of 99.9% or higher and a mean particle size of 1 μm were weighted to a molar ratio of 1:1, mixed by a wet mixing method, dried and calcined (pre-fired) by subsequently maintaining the mixture at 1400° C. for two hours. The resulting calcined $YAlO_3$ exhibiting high electrical insulating properties was pulverized to give powders having a mean particle size of approximately 1 μm.

$YCrO_3$ and $YAlO_3$ thus produced were weighed from sample to sample at mixing ratios shown in Table 1 and admixed with 1 wt % of $SiO_2$ powders having a mean particle size of 0.6 μm. The resulting mass was mixed together by a wet method (ball mill) to give a slurry mixture which as then passed through a 60-mesh sieve and subsequently dried. The dried mass was then admixed with a binder composed of 15 wt % of PVB, 10 wt % of DBP, 50 wt % of MEK and 25 wt % of toluene for granulating powders for press molding.

TABLE 1

| Sample Nos. | composition | | resistance value (KΩ) | | | β | | resistance change rate (%) | |
|---|---|---|---|---|---|---|---|---|---|
| | YCrO$_3$ | YAlO$_3$ | 300° C. | 650° C. | 900° C. | 300–650 | 650–900 | 300° | 900° C. |
| 1* | 100 | 0 | 0.45 | 0.085 | 0.06 | 2520 | 1510 | 15[−18] | 10[−81] |
| 2 | 95 | 5 | 13.2 | 0.382 | 0.130 | 5350 | 4670 | 15[−8] | 10[−27] |
| 3 | 90 | 10 | 35.6 | 0.780 | 0.240 | 5770 | 5104 | 12[−6] | 9[−23] |
| 4 | 80 | 20 | 70.0 | 0.905 | 0.285 | 6570 | 5000 | 8[−4] | 6[−16] |
| 5 | 70 | 30 | 96.4 | 1.081 | 0.327 | 6790 | 5180 | 7[−3] | 5[−13] |
| 6 | 65 | 35 | 157 | 1.824 | 0.478 | 6730 | 5800 | 10[−5] | 8[−17] |
| 7 | 60 | 40 | 296 | 2.836 | 0.735 | 7020 | 5850 | 13[−6] | 7[−16] |
| 8 | 55 | 45 | 363 | 3.591 | 0.952 | 6980 | 5750 | 15[−7] | 9[−20] |
| 9 | 50 | 50 | 497 | 5.100 | 1.385 | 6920 | 5650 | 15[−7] | 8[−18] |
| 10* | 20 | 80 | >30000 | 57.0 | 10.3 | — | 7409 | — | — |

*marks indicate Comparative Examples

The resulting powders were charged into a metal mold comprised of two platinum wires, each 0.4 mm in diameter, placed at an interval of 1.2 mm, and were pressed under a pressure of 98 MPa (1000 kg/cm$^2$), for producing a molded product, 3 mm in diameter and 2 mm in thickness, having two electrode lines of platinum wires, as shown in FIG. 1. The molded product was sintered in ambient air at 1550° C. to produce a thermistor element.

On the thermistor element, thus produced, resistance values in the atmosphere at 300° C., 650° C. and 900° C. were measured, and values of the temperature gradient constant β were calculated. The results are shown in the columns of the resistance and β. Next, the samples were maintained for 300 hours in the atmosphere at 1000° C. and the resistance values thereof at 300° C., 650° C. and 900° C. before and after the maintenance at 1000° C. were measured in order to check the durability. The results are shown in the resistance change rate column in Table 1. The inventive article exhibits high strength as lead wires and can be easily built into temperature sensors. This may presumably be ascribable to the lower sintering temperature.

In Table 1, β indicates the temperature gradient constant. The temperature gradient constant β, the resistance change rate and the resistance change rate calculated as temperature (converted temperature value derived from the resistance change rate) are defined by the following equation:

$$\beta = \ln(R/R_o)/(1/K - 1/K_o)$$

$$\text{resistance change rate} = (R_t - R_o)/R_o \times 100\%$$

where ln indicates common logarithm, and R and $R_o$ indicate resistance values at absolute temperatures K and $K_o$, respectively. In Table 1, 300–650 and 650–900 denote the temperature gradient constants β between 300° C. and 650° C. and between 650° C. and 900° C., respectively.

$R_t$ denotes the resistance value at an absolute temperature $K_t$ (t=300° C. or 900° C.) after maintenance at 1000° C. for 300 hours.

The values in the resistance change rate column, shown within squire brackets [ ], denote resistance changes before and after the test on durability, as converted into temperatures, and are defined by the following equation:

$$(\text{Resistance change rate, calculated as temperature}) = \beta \times K_o/(\ln(R/R_o) \times K_o + \beta) - K_o$$

It is seen from Table 1 that, by changing the YCrO$_3$/YAlO$_3$ mixing ratio, the resistance value can be adjusted easily. It is contemplated that no auxiliary components are yielded in the reaction between YCrO$_3$ and YAlO$_3$ and a two-phased mixture is produced after sintering, with the reaction system being simple, so that the resistance value can be adjusted very easily.

However, if the YAlO$_3$ ratio exceeds 80%, the sinterability is lowered, while the resistance value at 300° C. exceeds 30 megohms(MΩ) and it becomes difficult to measure the resistance value at a temperature range below 300° C., such that the thermistor becomes unsuitable for sensing lower temperatures. Above all, if the resistance value of the thermistor element is set so as to be higher than the insulation resistance between harness lead wires, the thermister element can hardly be used for detecting the temperature of the exhaust gases of automotive vehicles or as an alarm device for preventing overheating of the catalytic device for cleaning the exhaust gases of the automotive vehicles. The insulation resistances between the lead wires is occasionally lowered to a level of tens of megohms(MΩ). The sample number 10 has an insulating resistance of 30 megohms or higher and hence becomes unusable.

The resistance change rate of the thermistor element, as measured by the test on durability, was less than 20%, with an exception of sample number 10. Sample number 1 can hardly be used as a thermistor element for a detector device because the value of the constant β thereof is low, and equal to −81° C. in terms of the converted temperature value, thus exhibiting poor temperature accuracy.

Sample number 7 was maintained for ten hours in the atmosphere at 1100° C. and resistance values thereof at 300° C. and 900° C. before and after such maintenance were measured in order to check the resistance change rate. It was found that the change rate was 7% at 300° C., thus indicating the change of −3° C. in terms of the converted temperature value. The resistance change rate was 12% at 900° C., thus indicating the change of −26° C. in terms of the converted temperature value.

EXAMPLE 2

Example 2 is now explained.

Yb$_2$O$_3$ having a purity of 99.9% or higher and a mean particle size of 1.5 μm and Cr$_2$O$_3$ having a purity of 98.5% or higher and a mean particle size of 1 μm were weighed to a molar ratio of 1:1, mixed together by a wet mixing method, dried and subsequently calcined maintaining the mixture at 1400° C. for two hours. The resulting calcined YbCrO$_3$, exhibiting high electrical conductivity, was pulverized to give powders having a mean particle size of approximately 1 μm.

On the other hand, $Yb_2O_3$ having a purity of 99.9% or higher and a mean particle size of 1.5 μm and $Al_2O_3$ having a purity of 99.9% or higher and a mean particle size of 1 μm were weighed to give a molar ratio of 1:1, mixed together by a wet mixing method, dried and subsequently calcined maintaining the mixture at 1400° C. for two hours. The calcined mass was pulverized to give powders having a mean particle size of approximately 1 μm.

The two kinds of the powders, produced as described above, were weighed to give a composition shown in Table 2, and a thermistor element was produced by the same method as that of Example 1, and the various properties thereof were measured. The results are shown in Table 2. By the way, the respective columns of Tables 2 to 4 have the same meaning as Table 1.

Sample number 11, represented by $Yb(Cr_{0.60}Al_{0.40})O_3$, has the resistance of 150 kiloohms(KΩ) at 300° C., such that a thermistor element is produced which is capable of being employed in a temperature range from lower temperatures up to higher temperatures.

which corresponded to the change of −20° C. in terms of the temperature.

Example 4 is now explained. Thermistor elements having the compositions shown in Table 4 were produced by the same method as in Example 1 except using $Gd_2O_3$ having a purity of 99.9% and a mean particle size of 1 μm in place of $Y_2O_3$. Measurements were made of these elements in the same way as in Example 1, and the results shown in Table 4 were obtained.

In Table 4, the resistance change rate denotes the resistance change rate before and after the elements were maintained for 300 hours at 1000° C. and the corresponding change in terms of the converted temperature values. It is seen that, by setting X in the composition of $(GdCrO_3)_{1-x} \cdot (YAlO_3)_x$ so as to be 0.2 to 0.5, the thermistor elements could be produced which exhibited practically optimum resistance values and which exhibited only small resistance change rate value and the resistance change value in terms of the converted temperature value even when the elements were maintained at higher temperatures.

TABLE 2

| Sample Nos. | composition | | resistance value (KΩ) | | | β | | resistance change rate (%) | |
|---|---|---|---|---|---|---|---|---|---|
| | $YbCrO_3$ | $Yb_2O_3$—$Al_2O_3$ | 300° C. | 650° C. | 900° C. | 300–650 | 650–900 | 300° | 900° C. |
| 11 | 60 | 40 | 150 | 1.467 | 0.450 | 6990 | 5120 | 16[−7] | 6[−15] |

The sample number 11 was maintained for ten hours in atmosphere at 1100° C. and the resistance values thereof at 300° C. and 900° C. before and after such maintenance were measured in order to check the resistance change rate. It was found that the change rate at 300° C. was 11% which corresponds to a change of −5° C. in terms of the converted temperature value. The change rate at 900° C. was 7%, which corresponds to a change of −17° C. in terms of the converted temperature value.

EXAMPLE 3

Example 3 will be now explained. A thermistor element having a composition shown in Table 3 was produced by the same method as in Example 1 except using $Er_2O_3$ having a purity of 99.9% and a mean particle size of 1 μm. Measurements similar to those in Example 1 were made of the thermistor elements, and the results shown in Table 3 were obtained.

TABLE 3

| Sample Nos. | composition | | resistance value (KΩ) | | | β | | resistance change rate (%) | |
|---|---|---|---|---|---|---|---|---|---|
| | $ErCrO_3$ | $ErAlO_3$ | 300° C. | 650° C. | 900° C. | 300–650 | 650–900 | 300° | 900° C. |
| 12 | 60 | 40 | 250 | 2.010 | 0.590 | 7288 | 5308 | 12[−5] | 7[−18] |

Sample number 12 was maintained for ten hours in the atmosphere at 1100° C. and resistance values at 300° C. and 900° C. before and after such maintenance were measured in order to check the resistance change rate. The change rate at 300° C. was 14% which was the change of −6° C. in terms of the temperature. The change rate at 900° C. was 8%

TABLE 4

| Sample Nos. | composition | | resistance value (KΩ) | | | β | | resistance change rate (%) | |
|---|---|---|---|---|---|---|---|---|---|
| | GdCrO3 | YAlO$_3$ | 300° C. | 650° C. | 900° C. | 300–650 | 650–900 | 300° | 900° C. |
| 13 | 80 | 20 | 450 | 0.530 | 0.165 | 6710 | 5050 | 15.6[−7] | 3.8[−10] |
| 14 | 60 | 40 | 150 | 1.650 | 0.430 | 6820 | 5820 | 18.3[−8] | 4.8[−11] |
| 15 | 50 | 50 | 212 | 2.950 | 0.75 | 6460 | 5930 | 22.2[−10] | 4.0[−9] |

Sample number 14 was maintained for ten hours in the atmosphere at 1100° C. and the resistance values at 300° C. and 900° C. before and after such maintenance were measured in order to check the resistance change rate. It was found that the change rate at 300° C. was 18.4%, which corresponded to the change of −8° C. in terms of the converted temperature value. The resistance change rate at 900° C. was 44%, which corresponded to the change of −10° C. in terms of the converted temperature value.

Besides the liquid phase forming materials which are essential, the sintering aids may further optionally comprise one or more of the following materials CaO—SiO$_2$ type compounds, SrO—SiO$_2$ type compounds, MgO—SiO$_2$ type compounds, B$_2$O$_3$—SiO$_2$—Al$_2$O$_3$ type compounds and B$_2$O$_3$—SiO$_2$ type compounds.

It should be noted that modification obvious for one skilled in the art can be done without departing from the essential gist and scope of the present invention as disclosed hereinabove and claimed hereinbelow.

What is claimed is:

1. A ceramic composition for thermistor represented by the formula $(M^1M^2O_3)_{1-x} \cdot (M^1AlO_3)_x$, where $M^1$ is one or more elements selected from the elements belonging to the group 3A of the International Periodic Table excluding La, $M^2$ is one or more elements selected from the elements belonging to the groups 4A, 5A, 6A, 7A, and 8 of the International Periodic Table and 0.8>x>0, wherein a sintering aid is added to the composition.

2. The ceramic composition for thermistor as defined in claim 1 wherein $M^1$ is one or more elements selected from the group consisting of Y, Sm, Pr, Nd, Dy, Ho, Er, Gd and Yb, and $M^2$ is one or more elements selected from the group consisting of Cr, Ti, Mn, V, Fe and Co.

3. The ceramic composition for thermistor as defined in claim 1 or 2 wherein x is 0.05 to 0.5.

4. The ceramic composition for thermistor as defined in claim 1 wherein $M^1$ is Y or Gd and $M^2$ is Cr.

5. The ceramic composition for thermistor as defined in claim 3 wherein $M^1$ is Y or Gd and $M^2$ is Cr.

6. The ceramic composition for thermistor as defined in claims 2 or 4 wherein the sintering aid comprises silica and/or mullite.

7. The ceramic composition for thermistor as defined in claim 3 wherein the sintering aid comprises silica.

8. The ceramic composition for thermistor as defined in claim 1 wherein the sintering aid is present in an amount of 0.5 to 10 wt %.

9. The ceramic composition for thermistor as defined in claim 1 wherein the sintering aid is present in an amount of 0.8 to 5 wt %.

10. The ceramic composition for thermistor as defined in claim 1 wherein the sintering aid comprises silica and/or mullite.

11. The ceramic composition for thermistor as defined in claim 7 wherein the sintering aid further comprises at least one member selected from the group consisting of CaO—SiO$_2$ compounds, SrO—SiO$_2$ compounds, MgO—SiO$_2$ compounds, B$_2$O$_3$—SiO$_2$—Al$_2$O$_3$ compounds and B$_2$O$_3$—SiO$_2$ compounds.

12. A thermistor element having the ceramic composition as defined in any one of claims 1, 2 or 4 as a main constituent.

13. A thermistor element having the ceramic composition as defined in claim 3 as a main constituent.

14. A thermistor element having the ceramic composition as defined in claim 7 as a main constituent.

15. A process for producing a composition for thermistor comprising:

providing $M^1M^2O_3$ and $M^1AlO_3$, respectively, where $M^1$ is one or more elements selected from the elements belonging to the group 3A of the International Periodic Table excluding La, $M^2$ is one or more elements selected from the elements belonging to the groups 4A, 5A, 6A, 7A, and 8 of the International Periodic Table, providing a mixture comprising $(M^1M^2O_3)_{1-x} \cdot (M^1AlO_3)_x$ where 0.8>x>0, and adding a sintering aid to the mixture.

16. The process as defined in claim 15, wherein each of said $M^1M^2O_3$ and $M^1AlO_3$ is produced through calcinating a starting raw material mixture to form a calcined mass.

17. The process as defined in claim 15 wherein $M^1$ is one or more elements selected from the group consisting of Y, Sm, Pr, Nd, Dy, Ho, Er, Gd and Yb and $M^2$ is one or more elements selected from the group consisting of Cr, Ti, Mn, V, Fe and Co.

18. The process as defined in claim 15 wherein x is 0.05 to 0.5

19. The process as defined in claim 15 or 18 wherein $M^1$ is Y or Gd and $M^2$ is Cr.

20. The process as defined in any one of claims 15, 16 or 17 wherein the sintering aid comprises silica and/or mullite.

21. The process as defined in claim 10, wherein each of said calcined masses is pulverized to form a fine powder.

22. A process for producing a thermistor element, comprising the process as defined in claim 21, and further comprising sintering said pulverized powders.

23. The process as defined in claim 22, wherein the sintering aid is admixed to said pulverized powders.

24. The process as defined in claim 19 wherein the calcination is carried out approximately at 1200°–1400° C.

25. The process as defined in claim 19 wherein the calcination is carried out approximately at 1400° C.

26. A process for producing a thermistor element, comprising the process as defined in claim 24, and further comprising sintering said pulverized powders.

27. The process as defined in claim 22 or 23 wherein the sintering is carried out at a temperature approximately of 1450°–1600° C.

28. The process as defined in claim 22 or 23 wherein the sintering is carried out at a temperature approximately of 1550° C.

29. The process as defined in claim 20 wherein the sintering aid further comprises at least one compound selected from the group consisting of $CaO-SiO_2$ compounds, $SrO-SiO_2$ compounds, $MgO-SiO_2$ compounds, $B_2O_3-SiO_2-Al_2O_3$ compounds and $B_2O_3-SiO_3$ compounds.

\* \* \* \* \*